May 14, 1940. L. T. MAKRAM 2,201,110
BRICK OR BLOCK
Original Filed June 16, 1937  7 Sheets-Sheet 1
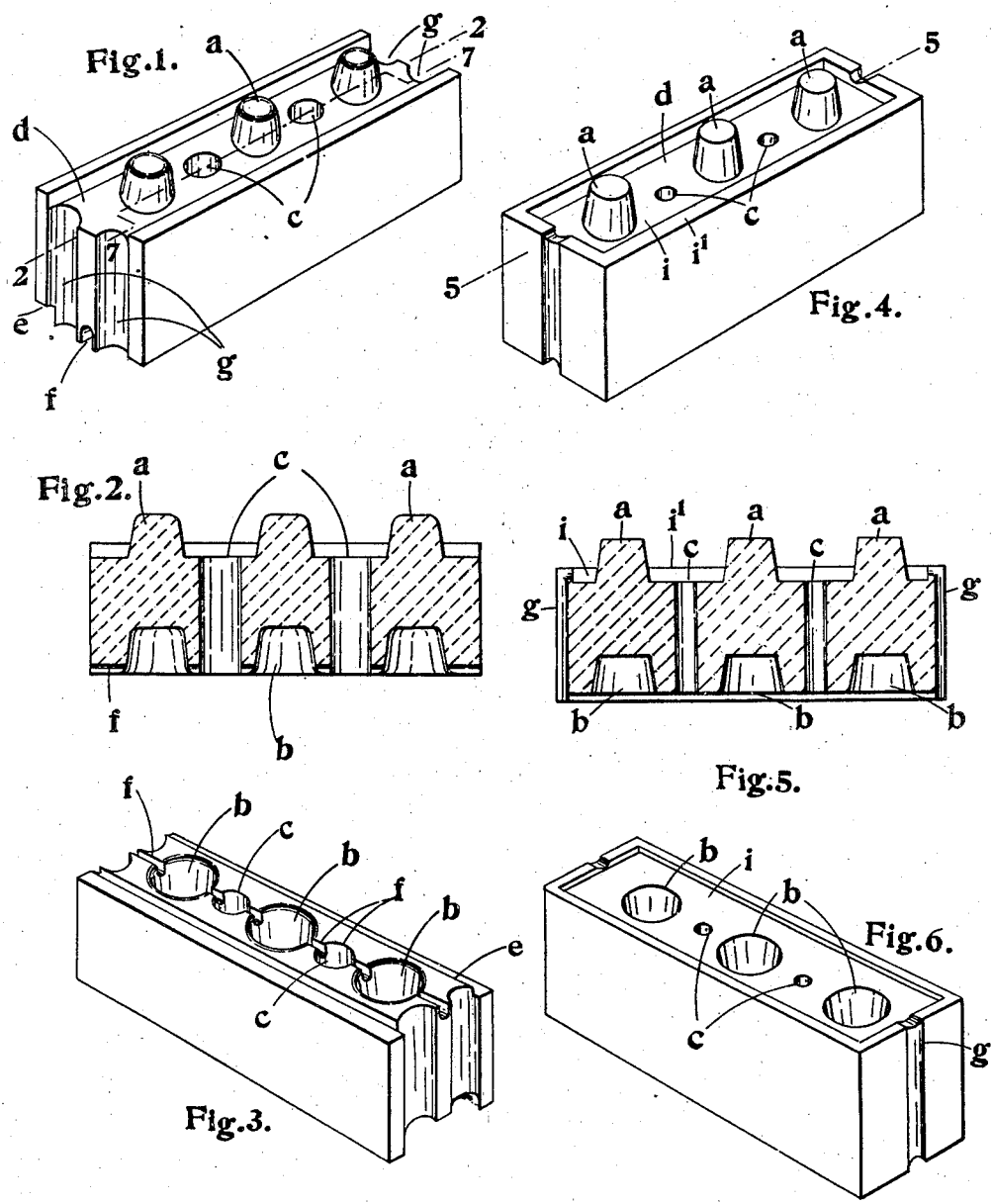

May 14, 1940.                L. T. MAKRAM                2,201,110
                              BRICK OR BLOCK
              Original Filed June 16, 1937        7 Sheets-Sheet 2
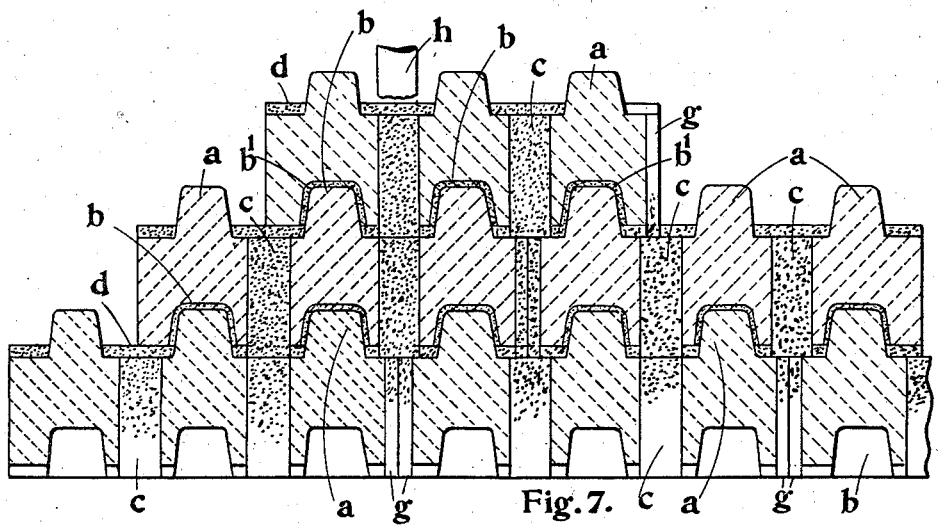
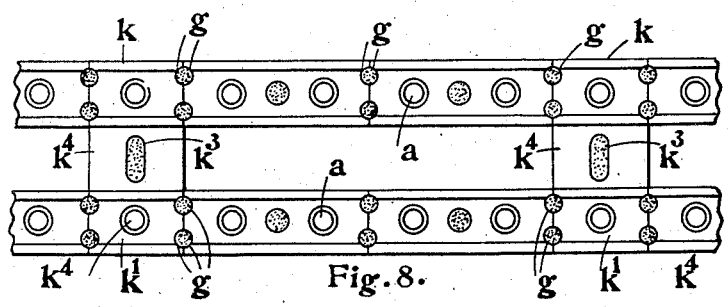
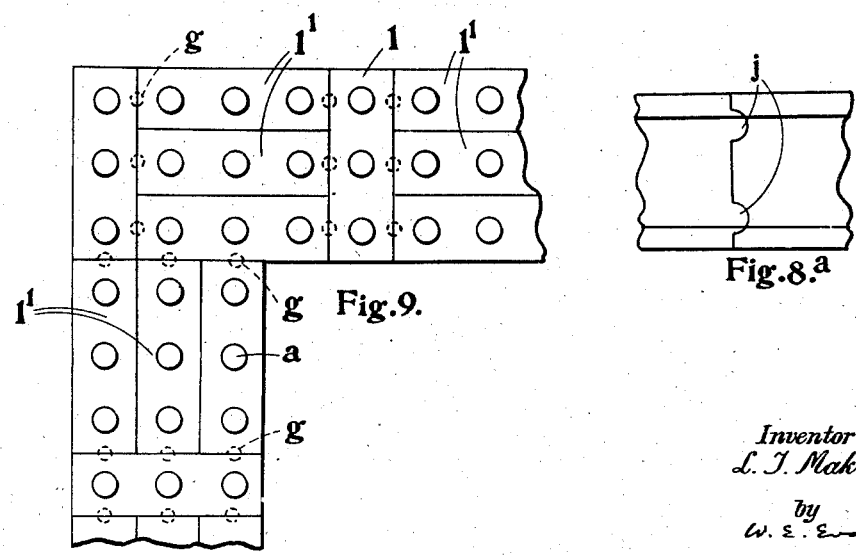
Inventor
L. T. Makram:
by
W. E. E———
Attorney May 14, 1940.    L. T. MAKRAM    2,201,110
BRICK OR BLOCK
Original Filed June 16, 1937    7 Sheets-Sheet 3

Inventor
L. T. Makram:
by
W. E. Evans:
Attorney.

May 14, 1940.　　　　　L. T. MAKRAM　　　　　2,201,110
BRICK OR BLOCK
Original Filed June 16, 1937　　7 Sheets-Sheet 4
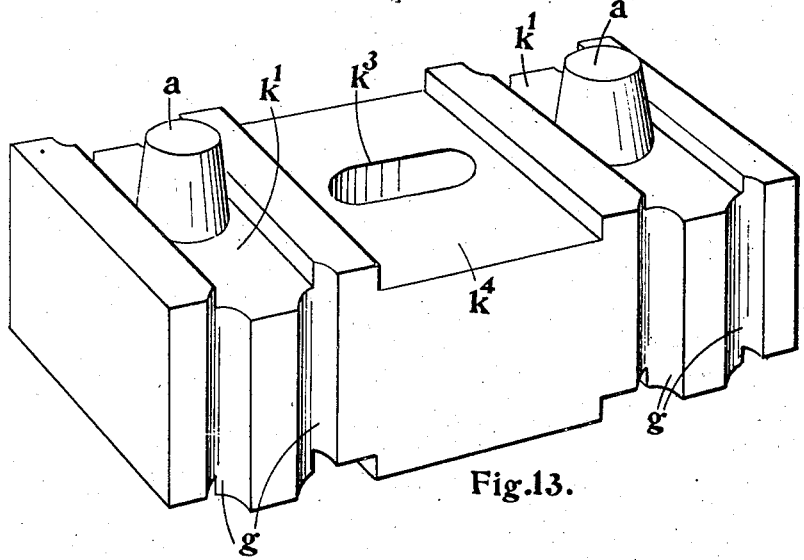
Fig.13.
Fig.14.
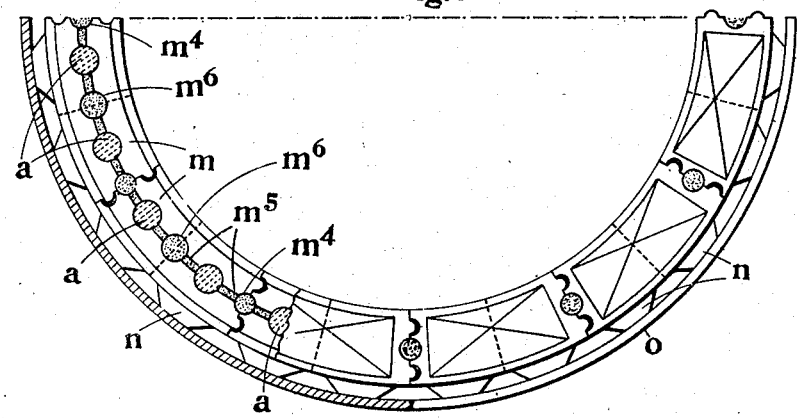
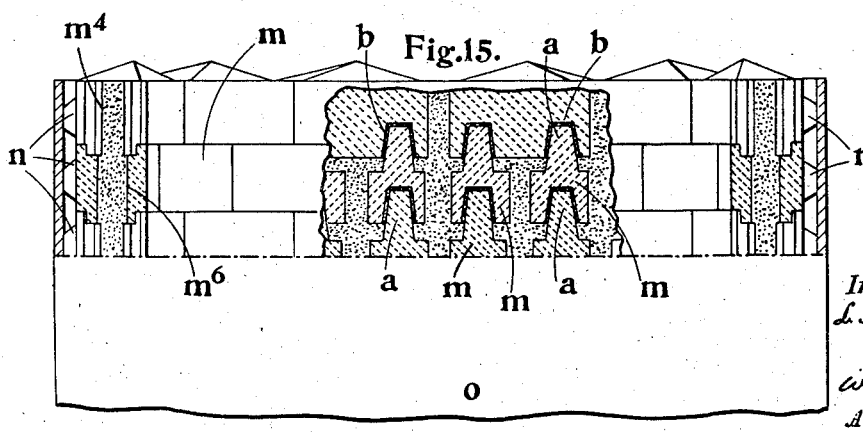
Inventor
L. T. Makram
by
W. E. Evans
Attorney.

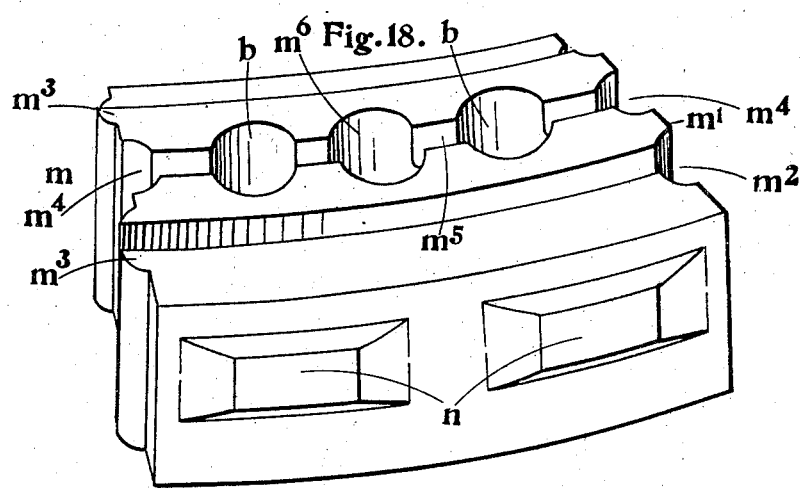
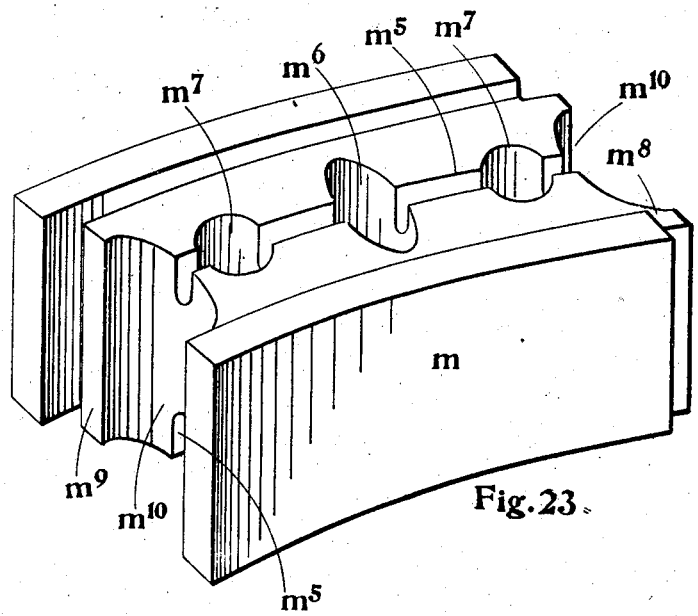

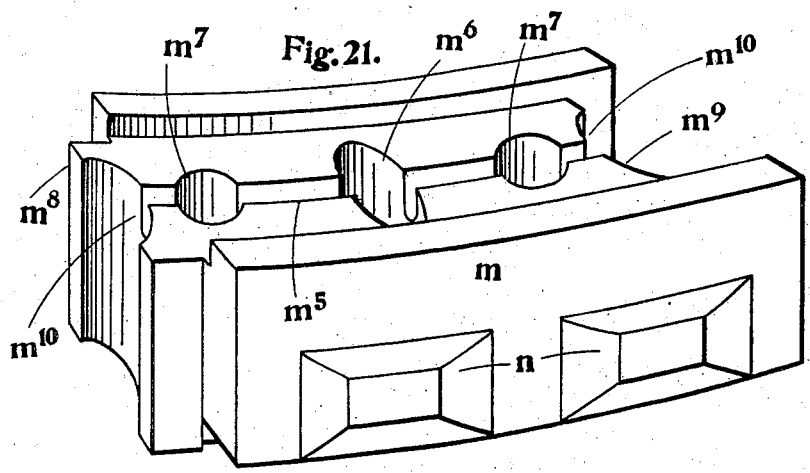
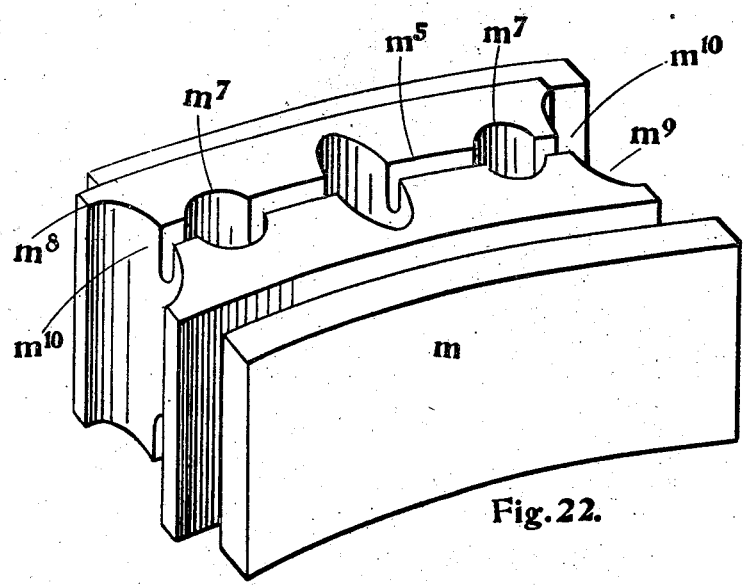

Patented May 14, 1940

2,201,110

UNITED STATES PATENT OFFICE 2,201,110

BRICK OR BLOCK

Latif Tewfik Makram, Cairo, Egypt

Application June 16, 1937, Serial No. 148,535.
Renewed October 19, 1939. In Great Britain
June 16, 1936

6 Claims. (Cl. 72—38)

This invention relates to bricks or blocks for use in general building and wall construction as well as in the production of refractory or fire bricks adapted for the building of furnaces and for furnace linings.

According to the invention there are provided on the top or bottom faces or on the top and bottom faces of the bricks or blocks a recess bordered by an upstanding rim, edge or flange, there being also provided vertical holes in the bricks or blocks in a vertical central position extending from the top to the bottom face, and vertical grooves on the end faces conveniently in a central position which may be of a substantially semi-circular shape in transverse cross-section, while the upstanding rim, edge or flange is also provided with a groove conveniently in a central position, the lower part of the groove being advantageously level with the recessed face of the brick or block, whereby on one brick or block being laid upon another a space is formed between the respective faces of the respective bricks or blocks into which liquid mortar or cement may be applied on being poured through one of the holes in the bricks or blocks applied or between their adjacent end faces, so that as the wall is built each brick or block may be completely surrounded by a luting of mortar or cement, and as there is inter-communication between the recesses above and beneath the respective bricks or blocks a reticulated framework may thus be produced of the mortar or cement on its setting by which the bricks or blocks are bound together.

The invention has also among its objects to effect the mechanical interlocking of the bricks together and so to form the bricks as to present a substantially continuous external surface or external surfaces without leaving a mortar or cement lining between the layers of bricks.

The invention is applicable in the formation of bricks of a segmental form adapted to be laid in circular line or in other than rectilinear line, as for example as a refractory lining within the cylindrical steel casing of a cupola or other furnace, as well as in the formation of end blocks for use at the end of the courses or layers of brickwork.

According to the invention the bricks or blocks are provided upon their top and bottom faces with means by which they may engage or interlock one with the other. Such means may consist for example of projections on the top or bottom face of any suitable form such as a truncated conical form and corresponding cavities in alignment at the opposite bottom or top face. Such respective projections and cavities may be two, three or more in number and may be so provided that the bricks may be laid according to any desired system of bonding, so that also the bricks may be used as tie bricks transversely disposed across the brickwork and in the building of cavity walls so that the ends of the tie bricks may be exposed on the exterior and interior faces of the brickwork. The respective sets of projections and cavities may be so provided that an annular space is formed in the cavities surrounding the corresponding projections, so that the liquid grouting may on the completion of a section of the brickwork be admitted through vertical or other holes provided in the bricks and pass from these holes laterally to the annular cavities surrounding the projections through a communicating channel which may extend to the end faces of the brick.

According to the invention moreover the end faces may be provided with a vertical channel or a number of separate vertical channels which may be two, three or other number, by which the liquid grouting may pass from channel to channel of the respective bricks in line, or the channel on the end face may be disposed in alignment or open to the ends of the channels provided in the top and bottom faces, so that thus channels are formed that completely surround the respective bricks and thus the liquid grouting on being poured into a section of the completed brickwork may completely surround the bricks in the setting. Thus according to the invention the end face may be provided with three vertical channels, one in a central position to communicate with the channels on the top and bottom faces of the brick, and one at each side of one of the end faces which may serve to engage in corresponding projections formed at the other end face, so that thus there may be an interlocking of the bricks at their top and bottom faces as well as their end faces.

According to the invention moreover the top and bottom faces may be provided with a central recessed part and corresponding projection extending the length of the brick short of the vertical faces, so as thus to form parallel flanges at one face of the brick by which a channel is formed between them, and ledges or shoulders at the opposite face in which the flanges of the next adjacent brick are accommodated so that thus on the external faces there is a substantially continuous face without any cement, mortar or grouting line. The projections at the top or bottom face of the brick may advantageously be formed on the channel face, while the holes may be formed upon the face that is provided with lateral ledges or shoulders.

According to the invention moreover the end faces may be respectively provided with a single projection and cavity in a central position, the cavity being provided at one end of the brick and the projection at the other, the projection and cavity advantageously having the same cross-section in the height and depth, so that thus at one end of the brick lateral ledges or shoulders are formed while at the other two corresponding flanges are formed so that the flanges at the end of one brick engage on the ledges or shoulders of the adjacent brick. Such a form of the bricks may be provided at both end faces with a vertical channel extending the height of the brick communicating with the respective channels at the top and bottom faces. In such a form of brick a number of transverse holes may be provided in the height of the brick to convey the liquid grouting to the inter-faces or cavities without any interlocking projections and cavities being employed.

According to a modification in the use of refractory fire clay for the production of fire-bricks adapted for use in furnaces, the external faces may be provided with projecting parts that are adapted to form a series of vertically disposed channels between the external series of bricks and the external wall of the furnace whether of steel, brickwork or other material of construction, so that thus a space may be provided between the refractory firebrick lining and the external courses or casing of the furnace which may serve as an insulating space or as an air space through which air may circulate.

It will be understood that the bricks as hereinbefore described are intended principally in the formation of a brick or block of the thickness intended for the wall. Thus according to the purpose of the bricks the thickness may be variable, but when so provided they are adapted also to be employed in the building of cavity walls by the use of transversely disposed tie bricks at the ends of the walls and in intermediate positions, and for this purpose the bricks or blocks may be provided of standard lengths in which the engaging projections and cavities may for example be two or more in number and adapted in form to be transversely disposed at the ends of the wall or in intermediate positions.

It will be also understood that by providing inter-communicating channels for the liquid grouting and the outer faces of the bricks to form continuous faces, the grouting is confined to the channels and to the cavities in the bricks.

The invention is illustrated by way of example in the accompanying diagrammatic drawings, in which—

Figure 1 is a top perspective view of a brick or block having three conical projections.

Figure 2 is a longitudinal section on the line 2—2 of Figure 1 showing the corresponding recesses for the projections for the brick or block upon which it is applied.

Figure 3 is an underneath perspective view corresponding to Figure 1.

Figures 4, 5 and 6 are views of a modified form of brick or block, the views being similar in form to those of Figures 1, 2 and 3.

Figure 7 is a diagrammatic sectional elevation of a part of a wall built up of bricks according to Figures 1 to 3, the section being taken substantially on the line 7—7 of Figure 1.

Figure 8 is a plan view of a cavity wall constructed of bricks of a modified form.

Figure 8a is a modified form of brick to that illustrated in Figure 8.

Figures 9 and 10 illustrate two separate courses of bonding at the corner of the building, the recesses and holes in the bricks for the cement being omitted.

Figures 12 and 13 are top and underneath perspective views of a transverse brick used in the construction of a cavity wall as illustrated in Figure 8.

Figure 14 is a part plan view of bricks of curvilinear shape for use in the lining of furnaces such as cupolas.

Figure 15 is a sectional elevation corresponding thereto.

Figures 16, 17 and 18 are rear, front and inverted views respectively of a curvilinear brick for use in such a furnace.

Figures 21, 22 and 23 are views of a modified form of brick similar to those illustrated in Figures 16, 17 and 18.

Figure 10:
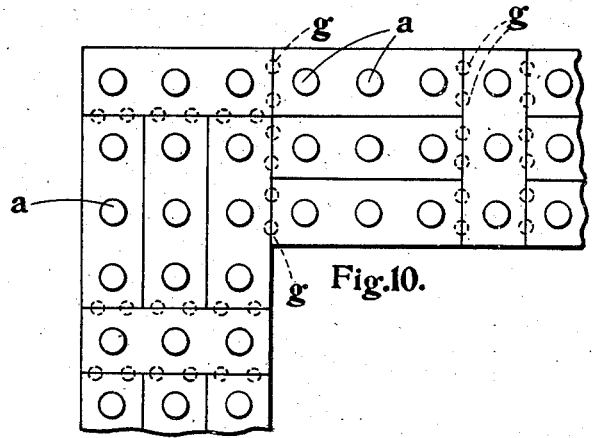

In carrying the invention into effect as illustrated in Figures 1, 2, 3 and 7 of the accompanying diagrammatic drawings $a$ are the projections on the horizontal face of the bricks and $b$ are the cavities. $c$ are the vertical holes extending through the bricks. $d$ is the channel on the top face and $e$ is the corresponding projecting part on the underface of the brick. $f$ are the horizontal communicating channels extending the length of the brick and communicating with the holes $c$ and cavities $b$. $g$ are the vertical cavities at the end faces.

The respective bricks or blocks may be provided with interlocking means $a$, $b$ and they may be provided of the same dimensions as a standard brick, or they may be provided of various lengths for example of a length of a brick and a half or half or other fractional part of a brick or of a length being a multiple of that of a standard brick or of one half or other fractional part thereof, according to the bonding required, for building solid or cavity walls of any desired thickness of wall or cavity.

The vertical passages through the bricks or at the respective ends of the bricks may instead of being used for the distribution of the liquid grouting be used for the reception of reinforcing metal such as reinforcing or tie rods $h$ (Figure 7) or one or more of the cavities $g$ at the ends of the bricks may be used for reinforcement. Thus a central vertical hole in the brick adjacent the cavities at each side may very conveniently be used for such a purpose.

As illustrated in Figures 4, 5 and 6, the brick or block is provided on one face, conveniently its upper face, with three projections $a$ in line lengthwise of the brick or block, and being so centrally disposed and set at the same distance apart that on the bricks or blocks being set end to end, the projections are disposed at equal intervals, there being provided on the opposite face of the brick or block recesses $b$ in the same central and relative positions corresponding in form to that of the projections $a$. The projections $a$ are conveniently formed as truncated cones integral with the brick or block, in which the base of the cone is of larger diameter than the upper end, and the relation of the projections $a$ and recesses $b$ is such that on one brick or block being mounted upon the other, the projections $a$ engage in the corresponding cavities $b$ advantageously forming a surrounding annular space into which a luting of liquid mortar or cement may enter. On the respective end faces a vertical groove $g$ may be provided in a central position which may be of a semi-circular form in transverse cross-section, and intermediate the projections, holes $c$ are provided that extend from the top to the bottom face. The top face or the bottom face or both the top and bottom faces of the bricks or blocks may be provided with a recess $i$ that extends short of the vertical faces of the brick or block to leave a surrounding flange $i^1$ or the equivalent forming a seat for the brick or block next above it in the setting by which on one brick or block being applied upon the other a cavity $i$ is formed within which a luting of mortar or cement may be passed through the holes provided in the bricks or blocks or at positions between the adjacent end faces thereof.

Thus a standard brick or block may have three projections and three corresponding cavities on its respective top and bottom faces and the bricks or blocks may also be provided with two such sets of projections and cavities. Where only one recess is provided such as hereinbefore described the opposite face of the brick or block may be provided with a lengthwise groove in a central position.

It will be understood that sets of projections and cavities may be provided on the opposite lateral faces of the bricks or blocks and recesses such as hereinbefore described may be provided on such lateral faces.

As illustrated in Figure 7 the vertical semi-circular recesses $g$ are brought into coincidence thus forming a circular hole upon the bricks being bonded. Thus in one particular form of course for example the middle one of those illustrated the vertical holes $c$ of one brick are disposed above and in alignment with those of the brick applied thereon, and likewise the recesses $g$ will coincide with a hole $c$ whereby the liquid mortar or cement will flow into and from the vertical holes $c$ into the recesses $g$ then into the longitudinal groove $f$ and into the annular chamber $b^1$ formed by the projection and recess thus forming a net-like structure of binding reinforcement.

For the construction of a cavity wall as for example to that illustrated in Figure 8 which shows a brick having only two projections for interlocking within correspondingly shaped recesses, the respective end walls of the brick are provided with two vertical recesses $g^1$ or as shown in Figure 8a in which one end wall is provided with vertical ridges $j$ that fit within the vertical recesses $g$ in the next brick of the course.

Transverse bricks $k$ are provided at intervals in the length of the wall thus formed, of a form illustrated in Figures 13 and 14 in which the projections $a$ are formed in the recess $k^1$ while the recesses $b$ are formed in the raised surface $k^2$ on the opposite side. These positions of the projections and recesses may however be reversed. A longitudinal hole $k^3$ is formed in the central part $k^4$ for the binding cement or for tie-rods, the central part $k^4$ also being recessed and raised correspondingly to the part $k^1$, $k^2$ while vertical recesses $g$ are also provided for the purpose hereinbefore described.

Figure 11:
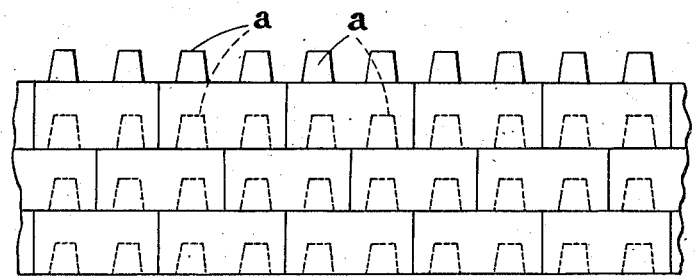
Figure 11 is an elevation of "English bonding" in the use of a brick according to the invention.
Figure 12:
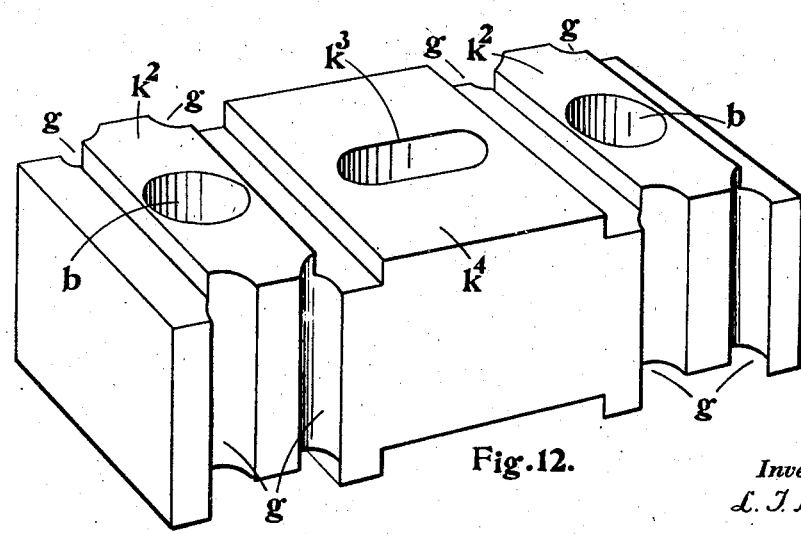
Figure 16:
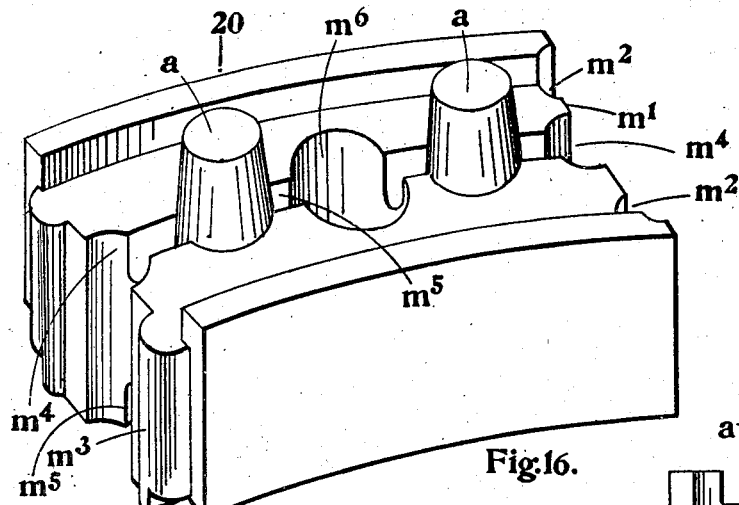
Figure 17:
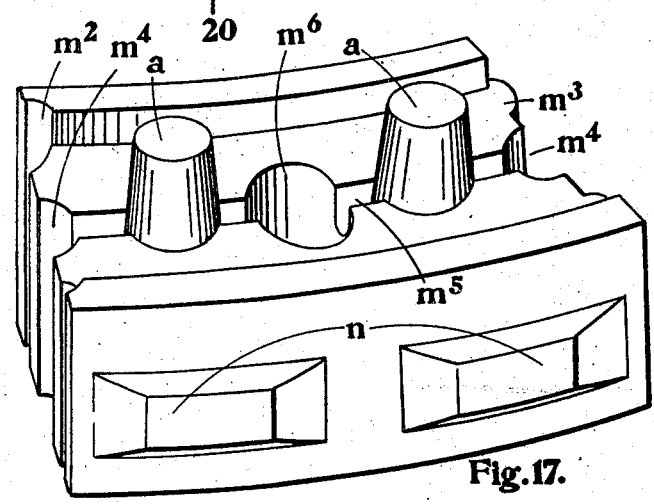
Figure 19:
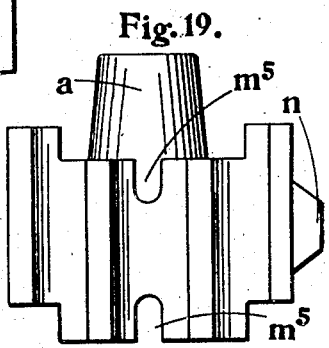
Figure 19 is an end view thereof.
Figure 20:
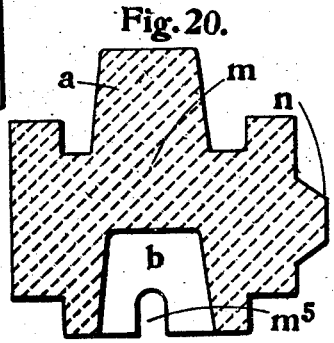
Figure 20 is a section on the line 20—20 of Figure 16.

The bonding of the bricks where three projections are used may be effected by various methods. In Figures 9, 10 and 11 two separate courses are shown of "English" bonding of a header 3-stretcher bond in which the cement recess or recesses $g$ in the header bricks $l$ are formed in the lateral faces for being brought into coincidence with those of the stretcher bricks $l^1$ and in the bricks $l^2$ that are used at the corners of a wall structure.

As illustrated in Figures 15 to 24 the invention may be carried into effect in its use for the lining of furnaces such as cupolas in the use of bricks $m$ such as hereinbefore described that are formed to a curvilinear shape corresponding to the radius of the lining. Thus such a curvilinear or segmental brick may be provided with radial end faces $m^1$ that engage or interlock, as for example by the provision of two cavities $m^2$ respectively near the vertical edge and corresponding ridges $m^3$ at the other end of the brick in coincident position, so that thus the ridges and cavities may engage and the bricks at each side of the ridges and cavities contact to make a good joint, while in a central position at the end faces vertical cavities $m^4$ may be provided of a semi-circular or other similar shape so that on the bricks being brought together a vertical channel may be provided at each end that communicates with the central channels $m^5$ provided between the respective top and bottom faces of adjacent bricks through which the grouting may pass into the annular spaces between the projections $a$ and cavities $b$.

Between the projections $a$ further holes $m^6$ are provided for the grouting. Thus in the bonding of the curvilinear bricks these holes $m^6$ will be positioned above the holes formed by the semi-circular cavities $m^4$.

The external faces are provided with projecting parts $n$ that are adapted to form a series of vertically disposed channels between the external series of bricks and the external wall $o$ of the furnace whether of steel, brickwork or other material of construction, so that thus a space may be provided between the refractory fire-brick lining and the external courses or casing of the furnace which may serve as an insulating space or as an air space through which air may circulate.

In the modified form of curvilinear brick as illustrated in Figures 22, 23 and 24, the projections $a$ are dispensed with and the recesses $b$ are continued completely through the brick thus forming further grouting holes $m^7$. In these constructions the ridges $m^3$ also are dispensed with and the interlocking is effected by forming one end $m^8$ of the brick to extend outwardly to fit within a corresponding recess $m^9$ formed in the opposite end of the next brick in the course. Semi-oval shaped cavities $m^{10}$ are formed in the projecting and recessed parts $m^8$ and $m^9$ whereby upon two bricks being interlocked an oval-shaped hole is formed. If desired the projections $n$ may be omitted in the construction of a wall of circular shape other than for the purpose specified.

Bricks or blocks such as hereinbefore described are adapted to be made in a miniature form for use as toys.

I claim:

1. A building brick or block comprising longitudinally extending flanges on the top face, correspondingly cut-away portions or grooves in the bottom face, a plurality of projecting members on the top face, recesses in corresponding positions on the bottom face of dimensions to leave spaces around the projections and between the interfaces of the brick when the bricks are laid one upon the other, holes extending from the top to the bottom faces of the brick or block and a communicating channel extending longitudinally around the brick or block to enable cement or mortar to be passed into the spaces, holes and channels between adjacent bricks.

2. A building brick or block comprising longitudinally extending flanges on the top face, correspondingly cut-away portions or grooves in the bottom face, a plurality of projecting members on the top face, recesses in corresponding positions on the bottom face of dimensions to leave spaces around the projections and between the interfaces of the brick when the bricks are laid one upon the other, holes extending from the top to the bottom faces of the brick or block, vertical ribs in one end face, corresponding vertical grooves in the other end face, and a communicating channel extending longitudinally around the brick or block to enable cement or mortar to be passed into the spaces, holes and channels between adjacent bricks or blocks.

3. A building brick or block comprising longitudinally extending flanges on the top face, correspondingly cut-away portions or grooves in the bottom face, a plurality of projecting members on the top face, recesses in corresponding positions on the bottom face of dimensions to leave spaces around the projections and between the interfaces of the brick when the bricks are laid one upon the other, holes extending from the top to the bottom faces of the brick or block, vertical ribs in one end face, corresponding vertical grooves in the other end face, projecting parts on the external lateral faces of the brick or block and a communicating channel extending longitudinally around the brick or block to enable cement or mortar to be passed into the spaces, holes and channels between adjacent bricks or blocks.

4. A building brick or block bordered on top and bottom faces by upstanding flanges, a plurality of projecting members on the top face, recesses in corresponding positions on the bottom face of dimensions to leave spaces around the projections and between the interfaces of the brick or block when the bricks or blocks are laid one upon the other, holes extending from the top to the bottom faces of the brick or block and vertical grooves in the end faces communicating with centrally disposed grooves provided in the flanges at the ends of the brick or block to enable cement or mortar to be passed into the spaces, holes and channels between adjacent bricks or blocks.

5. A building brick or block comprising longitudinally extending flanges on the top face, correspondingly cut-away portions or grooves in the bottom face, holes extending from the top to the bottom faces of the brick or block, a lengthwise projection in one end face, a correspondingly formed recess in the opposite end face, grooves or channels formed in said projection and said recess and channels in the top and bottom faces to enable cement or mortar to be passed into the spaces, holes and channels between adjacent bricks or blocks.

6. A building brick or block for use as a tiebrick in the construction of a cavity wall, comprising parallel recesses formed in the top face of the brick or block and extending transversely of the brick or block, projecting portions formed at corresponding positions in the bottom faces of the brick or block, a plurality of projecting members on the top face, recesses in corresponding positions on the bottom face, vertical grooves or channels formed in the longer sides of the brick or block and a centrally formed hole extending between the top and bottom faces of the brick or block.

LATIF TEWFIK MAKRAM.